Dec. 8, 1931.   C. T. MASON   1,835,607
AUTOMOBILE LAMP MOUNTING
Filed Aug. 4, 1928
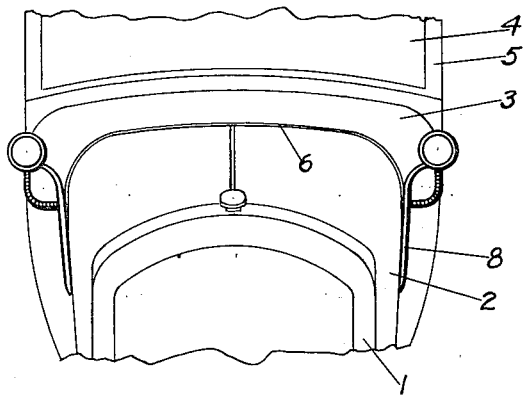
FIG. 1
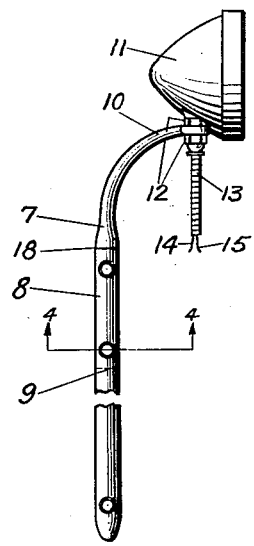
FIG. 3
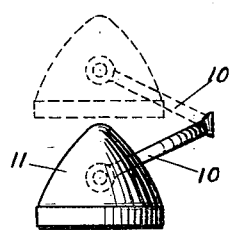
FIG. 2
FIG. 5
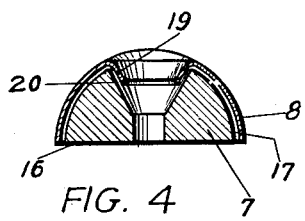
FIG. 4
INVENTOR
CARL T. MASON
BY
A. D. T. Libby
ATTORNEY Patented Dec. 8, 1931

1,835,607

UNITED STATES PATENT OFFICE

CARL T. MASON, OF EAST ORANGE, NEW JERSEY, ASSIGNOR TO TIFFANY MANUFACTURING COMPANY, OF NEWARK, NEW JERSEY

AUTOMOBILE LAMP MOUNTING

Application filed August 4, 1928. Serial No. 297,405.

This invention relates to the construction of a lamp bracket especially adapted for mounting cowl lamps on an automotive vehicle. It is one of the objects of my invention to provide a lamp bracket for mounting a cowl lamp in any one of a plurality of positions. Another object of my invention is to provide a bracket mounting for cowl lamps in which the bracket also becomes a part of the ornamental trimming of the cowl or the forward portion of the automotive vehicle. My invention will be readily understood by reference to the attached drawings, wherein—

Figure 1 is a fragmentary view illustrating the forward end of an automotive vehicle.

Figure 2 is a plan view of the lamp and bracket, showing two positions which the lamp may take.

Figure 3 is a side elevation of the lamp bracket, showing the lamp turned to illustrate a side view thereof.

Figure 4 is a section on the line 4—4 of Figure 3.

Figure 5 is a side view of the lower end of Figure 3.

In the drawings, 1 illustrates the radiator of an automobile which has a hood 2 and cowl 3. The windshield 4 is held in the frame 5. In certain makes of automobiles at the present time, it is customary to have a bead or metal trimming 6 at the junction of the hood and cowl. These ornamental trimming devices are usually plated either nickel or chrome to give a contrasting effect to both the cowl 3 and the hood 2.

The lamp bracket of this invention is one which performs two functions; i. e., that of supporting the cowl lamp, and at the same time acting as an adjunct to the ornamental trimming on the automobile. The bracket per se is preferably made up of two portions 7 and 8. The portion 7 which extends downward to the dotted line 9, of Figure 3, is preferably rigid and made of a drop-forging or a die-casting, and has an extended curved arm 10, the end of which is suitably enlarged to receive the stem of the lamp socket carried by the lamp 11, it being understood that the stem of the lamp socket extends through the casing of the lamp 11 and is threaded to receive the lock nuts 12. 13 illustrates the cable carrying the electric conductors 14 and 15 carrying current to the lamp.

The lower portion of the bracket 7 has a flat surface 16 to fit against part of the supporting means and also has a curved surface 17 beginning at point 18. On this curved surface 17, there is fitted the arcuately-formed lower portion 8 of the lamp bracket. At a suitable number of points, the arcuately-formed member 8 has indentations 19 to fit in the counter-sunk holes 20 in the member 7. The parts 19 and 20 act as positioning members, as well as to receive the heads of the mounting screws. The portion 8 is made of relatively thin material so that it can be readily made to conform to the contour of the surface to which it is applied.

As illustrated in Figure 1, the arcuately-formed member 8 fits directly over the bead or trimming 6, thereby merging with it and becoming a part of the trim. Since the member 8 is more or less flexible, it can be readily made to fit the surface of the trim. The brackets are made right and left-handed and can be applied to the automobile so as to make the lamp 11 take the position shown in full line in Figure 2, or the position shown in dotted lines in Figure 2. In other words, the lamp may be made to take a forward or a rearward position on the cowl with respect to the windshield.

In addition to being adapted to be mounted on the cowl as explained, the bracket may also be mounted on the frame 5 of the windshield, in which case it is of course mounted in reverse position; that is to say, the bracket extends upward along the frame of the windshield. Due to the curved extension end 10, the lamp 11 may be brought to the desired location with respect to the cowl. When so mounted, the lamp may be reversed in position on the arm, and since it is pivotally mounted by means of the stem of the lamp socket and the lock nuts 12, the lamp can be quickly adjusted for direction of the light rays. As shown in the drawings, the parts 7 and 8 are preferably made in two pieces as described, but the bracket of course may be made of one piece and the claims are intended for both forms.

Having thus described my invention, what I claim is:

1. A lamp bracket for an automobile comprising; a rigid portion having an extended curved arm with means on the extremity thereof for pivotally mounting a lamp thereon, said rigid portion having a flat and a curved surface, the flat surface adapted to contact with a surface of the automobile and an arcuately-formed portion fitting over said rigid portion and extending therefrom so the curved portion thereof and said arcuate surface form a smooth junction with each other, said extending portion being of thin metal whereby it may be easily forced to conform to the surface to which it is fastened.

2. A two-piece cowl lamp bracket for an automobile comprising; a rigid portion having an extended curved arm with means on the outer extremity thereof for pivotally mounting a lamp thereon, said rigid portion adapted to be attached to the cowl immediately adjacent the beginning of the hood and having a curved surface to match the finish between the cowl and hood, and a flexible metallic member joined to said rigid portion on its curved surface and extending as a continuation of the same as and for the purposes described.

In testimony whereof, I affix my signature.

CARL T. MASON.